United States Patent
Amato et al.

(10) Patent No.: US 11,797,717 B2
(45) Date of Patent: Oct. 24, 2023

(54) BUS ENCRYPTION FOR NON-VOLATILE MEMORIES

(71) Applicant: Micron Technology, Inc., Boise, ID (US)

(72) Inventors: Paolo Amato, Treviglio (IT); Marco Sforzin, Cernusco sul Naviglio (IT); Daniele Balluchi, Cernusco sul Naviglio (IT); Danilo Caraccio, Milan (IT); Niccolo Izzo, Vignate (IT)

(73) Assignee: Micron Technology, Inc., Boise, ID (US)

( * ) Notice: Subject to any disclaimer, the term of this patent is extended or adjusted under 35 U.S.C. 154(b) by 245 days.

(21) Appl. No.: 16/765,224

(22) PCT Filed: May 21, 2019

(86) PCT No.: PCT/IB2019/000420
§ 371 (c)(1),
(2) Date: May 19, 2020

(87) PCT Pub. No.: WO2020/234616
PCT Pub. Date: Nov. 26, 2020

(65) Prior Publication Data
US 2021/0406411 A1 Dec. 30, 2021

(51) Int. Cl.
G06F 21/85 (2013.01)
G06F 12/02 (2006.01)
(Continued)

(52) U.S. Cl.
CPC .......... G06F 21/85 (2013.01); G06F 12/0246 (2013.01); G06F 12/1408 (2013.01); G06F 21/602 (2013.01); G06F 21/79 (2013.01)

(58) Field of Classification Search
CPC .... G06F 21/85; G06F 12/0246; G06F 21/602; G06F 21/79
(Continued)

(56) References Cited

U.S. PATENT DOCUMENTS 7,184,550 B2 * 2/2007 Graunke ............... H04L 9/0861
380/42
9,069,703 B2 6/2015 Raam
(Continued)

FOREIGN PATENT DOCUMENTS

AU 2015100411 A4 * 5/2015 ........... G06Q 20/027
CN 013338217 A * 10/2013 ........... G06F 15/173
(Continued)

OTHER PUBLICATIONS

Huo et al., "Physical layer phase encryption for combating the traffic analysis attack", IEEE, doi: 10.1109/ISEMC.2014.6899042, 2014, pp. 604-608. (Year: 2014).*
(Continued)

*Primary Examiner* — Peter C Shaw
(74) *Attorney, Agent, or Firm* — Brooks, Cameron & Huebsch, PLLC

(57) ABSTRACT

The present disclosure relates to apparatuses and methods for memory management. The disclosure further relates to an interface protocol for flash memory devices including at least a memory array and a memory controller coupled to the memory array.
A host device is coupled to the memory device through a communication channel and a hardware and/or software full encryption-decryption scheme is adopted in the communication channel for data, addresses and commands exchanged between the host device and the memory array.

16 Claims, 6 Drawing Sheets

(51) Int. Cl.
*G06F 21/60* (2013.01)
*G06F 21/79* (2013.01)
*G06F 12/14* (2006.01)

(58) Field of Classification Search
USPC .......................................................... 713/189
See application file for complete search history.

(56) References Cited

U.S. PATENT DOCUMENTS

| | | | | |
|---|---|---|---|---|
| 2002/0194389 | A1* | 12/2002 | Worley, Jr. | G06F 9/4812 719/310 |
| 2005/0278548 | A1* | 12/2005 | Lin | H04L 9/0637 713/189 |
| 2006/0107072 | A1* | 5/2006 | Umezu | G06F 12/1408 713/193 |
| 2007/0198851 | A1* | 8/2007 | Goto | G06F 12/145 713/168 |
| 2009/0172415 | A1* | 7/2009 | Takeda | G06F 12/1408 713/190 |
| 2014/0040639 | A1* | 2/2014 | Raam | G06F 21/78 713/193 |
| 2014/0223197 | A1 | 8/2014 | Gueron et al. | |
| 2014/0341373 | A1* | 11/2014 | Song | H04L 9/0869 380/28 |
| 2016/0098568 | A1* | 4/2016 | Bushman | G06F 3/067 713/189 |
| 2016/0169973 | A1* | 6/2016 | Leclerc | G01R 31/31718 702/119 |
| 2016/0188523 | A1* | 6/2016 | Teoh | G06F 13/1668 710/105 |
| 2017/0185538 | A1* | 6/2017 | Khan | G06F 21/88 |
| 2017/0337390 | A1* | 11/2017 | Hamilton | H04L 9/0861 |

FOREIGN PATENT DOCUMENTS

| | | | | |
|---|---|---|---|---|
| CN | 106295373 A | * | 1/2017 | ............. G06F 21/34 |
| CN | 106295374 A | * | 1/2017 | ......... G06F 13/1668 |
| CN | 106372516 A | | 2/2017 | |
| CN | 107094108 A | * | 8/2017 | ....... H04L 12/40006 |
| CN | 108920964 A | * | 11/2018 | ............ G06F 21/602 |
| CN | 109101186 A | * | 12/2018 | ............ G06F 3/0604 |
| CN | 109101189 A | * | 12/2018 | ............ G06F 3/0604 |
| CN | 106295373 B | | 2/2019 | |
| EP | 3570489 A1 | * | 11/2019 | ........... H04L 9/3239 |
| JP | 2008035305 A | * | 2/2008 | |
| KR | 20130136008 A | * | 12/2013 | ............. G06F 12/14 |
| TW | 200830830 A | * | 7/2008 | ............. G06F 21/34 |
| WO | WO-2008086958 A1 | * | 7/2008 | ........... H04L 9/3231 |

OTHER PUBLICATIONS

Meiliasari et al., "Performance Analysis of the Symmetric Proxy Re-encryption Scheme", IEEE, doi: 10.1109/IWBIS.2019.8935670, 2019, pp. 91-96. (Year: 2019).*

Zuquete et al., "Physical-layerencryption with stream ciphers", IEEE, doi: 10.1109/ISIT.2008.4594957, 2008, pp. 106-110. (Year: 2008).*

Huo et al., "Physical layer phase encryption for combating the traffic analysis attack," 2014 IEEE International Symposium on Electromagnetic Compatibility (EMC), 2014, pp. 604-608, doi: 10.1109/ISEMC.2014.6899042. (Year: 2014).*

Almuhammadi et al., "Double-Hashing Operation Mode for Encryption," 2017 IEEE 7th Annual Computing and Communication Workshop and Conference (CCWC), 2017, pp. 1-7, doi: 10.1109/CCWC.2017.7868481. (Year: 2017).*

Ahmad et al., "Study of a new physical layer encryption concept," 2008 5th IEEE International Conference on Mobile Ad Hoc and Sensor Systems, 2008, pp. 860-865, doi: 10.1109/MAHSS.2008.4660138. (Year: 2008).*

Cepheli et al., "An encryption aware physical layer security system," 2017 IEEE International Conference on Communications Workshops (ICC Workshops), 2017, pp. 1277-1281, doi: 10.1109/ICCW.2017.7962834. (Year: 2017).*

Zuquete et al., "Physical-layer encryption with stream ciphers," 2008 IEEE International Symposium on Information Theory, Toronto, ON, Canada, 2008, pp. 106-110, doi: 10.1109/ISIT.2008.4594957. (Year: 2008).*

Karri et al., "Concurrent error detection schemes for fault-based side-channel cryptanalysis of symmetric block ciphers," in IEEE Transactions on Computer-Aided Design of Integrated Circuitsand Systems, vol. 21, No. 12, pp. 1509-1517, Dec. 2002, doi: 10.1109/TCAD.2002.804378. (Year: 2002).*

Almuhammadi et al., "Double-Hashing Operation Mode for Encryption," 2017 IEEE 7th Annual Computing and Communication Workshop and Conference (CCWC), Las Vegas, NV, USA, 2017, pp. 1-7, doi: 10.1109/CCWC.2017.7868481. (Year: 2017).*

Pérez-Resa et al., "Physical Layer Encryption for Industrial Ethernet in Gigabit Optical Links," in IEEE Transactions on Industrial Electronics, vol. 66, No. 4, pp. 3287-3295, Apr. 2019, doi: 10.1109/TIE.2018.2847670. (Year: 2019).*

International Search Report and Written Opinion from related International Application No. PCT/IB2019/000420, dated Feb. 17, 2020, 13 pages.

* cited by examiner

BUS ENCRYPTION FOR NON-VOLATILE MEMORIES

PRIORITY INFORMATION

This application is a U.S. National Stage Application under 35 U.S.C. § 371 of International Application Number PCT/IB2019/000420, filed on May 21, 2019, the contents of which are incorporated herein by reference.

TECHNICAL FIELD

The present disclosure relates generally to memory devices, and more particularly, to apparatuses and methods for memory management. This disclosure further relates to an interface protocol for flash memory devices.

BACKGROUND

Memory devices are typically provided as internal, semiconductor, integrated circuits in computers or other electronic devices. There are many different types of memory including volatile and non-volatile memory. Volatile memory can require power to maintain its data and includes Random-Access Memory (RAM), Dynamic Random-Access Memory (DRAM), and Synchronous Dynamic Random-Access Memory (SDRAM), among others.

Non-volatile memory can provide persistent data by retaining stored data when not powered and can include NAND flash memory, NOR flash memory, Read Only Memory (ROM), Electrically Erasable Programmable ROM (EEPROM), Erasable Programmable ROM (EPROM), and resistance variable memory such as phase change random access memory (PCRAM), self-selecting chalcogenide-based memories, resistive random access memory (RRAM), 3D XPoint memory (3DXP) and magneto resistive random access memory (MRAM), among others.

Memory is also utilized as volatile and non-volatile data storage for a wide range of electronic applications and systems. Non-volatile memory may be used in, for example, personal computers, portable memory sticks, digital cameras, cellular telephones, portable music players such as MP3 players, movie players, and other electronic devices. Memory cells can be arranged into arrays, with the arrays being used in memory devices.

The storage of data has always been relevant for system performance, but it is becoming a key element also for system security.

Today's most performing mobile NAND memories are based on UFS, standardized by the JEDEC group. The UFS protocol already offers two security primitives: data encryption with AES-XTS and Replay Protected Memory Block (RPMB) functionalities, enforced using a SHA-256 HMAC authentication for commands. However, these encryption mechanisms, on one end, lack drive authentication and access pattern obfuscation. Moreover, they are not designed to leverage emerging Non-Volatile Memories (NVMs) features such as small page size and in-place updates.

There is a need for providing a new interface architecture that can be easily integrated in a UFS stack and improves performances while not increasing write amplification.

DETAILED DESCRIPTION

As it is known in this specific technical field, Universal Flash Storage (UFS) is a high-performance interface designed for use in electronic applications where power consumption needs to be minimized, including mobile systems such as smart phones and tablets as well as automotive applications. Its high-speed serial interface and optimized protocol enable significant improvements in throughput and system performance.

More specifically, UFS is a flash storage specification for digital cameras, mobile phones and consumer electronic devices. It aims to bring higher data transfer speed and increased reliability to flash memory storage, while reducing market confusion and removing the need for different adapters for different types of memory cards.

This standard flash memory specification is supported by leading firms in the consumer electronics industry. Moreover, UFS is positioned as a replacement for eMMCs (embedded Multi Media Cards) and SD cards.

The electrical interface for UFS uses a high-speed serial interface and implements a full-duplex Low-voltage Differential Signaling (LVDS) serial interface. The LVDS interface is a technical standard that specifies electrical characteristics of a differential serial communications protocol that scales better to higher bandwidths than the 8-lane parallel interface of eMMCs.

The UFS standard is developed by, and available from, the JEDEC Solid State Technology Association that updates periodically the standard. Even the Linux kernel supports UFS.

This UFS protocol is gaining popularity in the mobile market as users demand faster response times and use high-bandwidth applications such as videogames. In its latest version (3.0), UFS offers two security primitives: data encryption with AES-XTS and RPMB functionalities, enforced using a SHA-256 HMAC authentication.

Figure 1:
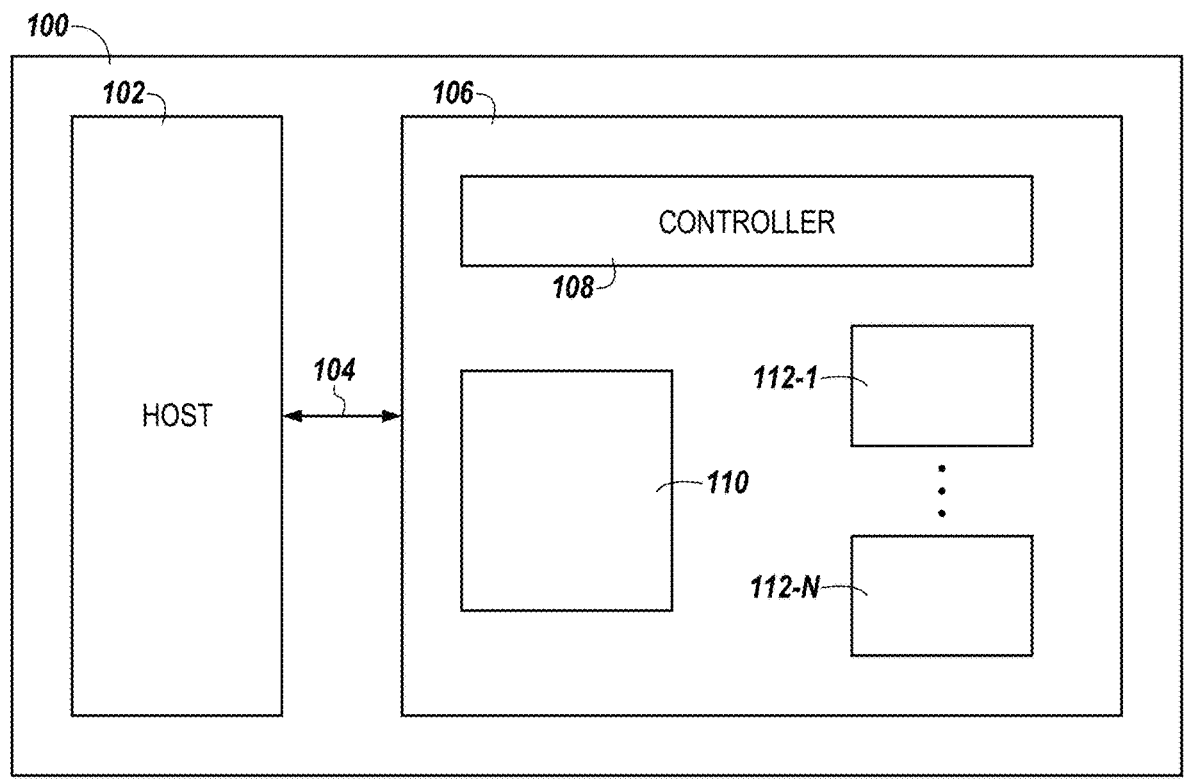
FIG. 1 shows a block diagram of an apparatus in the form of a computing system including a memory device in accordance with several embodiments of the present disclosure.
Figure 1A:
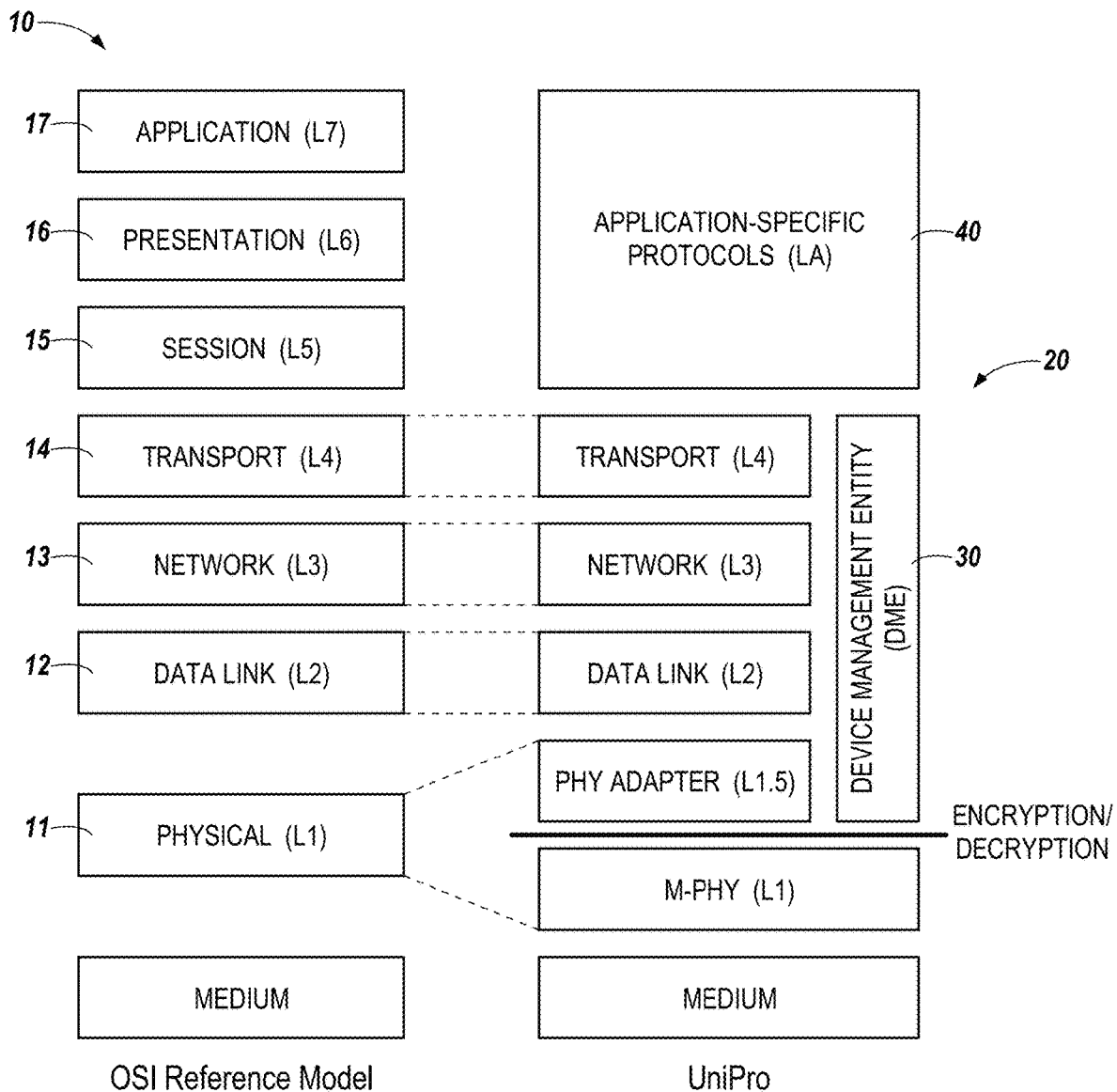
FIG. 1A is a schematic view of a block diagram showing a comparison between OSI/RM layers and a UniPro layers specification for a UFS interface protocol used in the memory device of the present disclosure.

FIG. 1A shows a schematic comparison between a stack 10 of OSI/RM layers and a stack 20 of UniPro layers specification for a UFS interface protocol. A manner to consider a protocol stack is that of looking at it as a processing pipeline wherein any layer of the stack provides services that depends on the layer below it.

The Open Systems Interconnection model (OSI model) shown on the left column of FIG. 1A is a conceptual model that characterizes and standardizes the communication functions of a telecommunication or computing system without regard to its underlying internal structure and technology. Its goal is the interoperability of diverse communication systems with standard protocols. The model partitions a communication system into abstraction layers. The original version of the model defined seven layers.

Communication between higher layers tends to be at high level of abstraction while communication between lower layers tend to be at a low level of abstraction.

Both the shown protocols may support communications to and from devices such as camera or display modules, high-speed modems, co-processors etc. and may be implemented entirely in hardware or as software running on a general-purpose processor or any other combination of hardware and software.

Each layer in the right stack 20 of the UniPro protocol provides substantially the same functionality as the corresponding layer of in the left stack 10 of the OSI/RM protocol.

Each layer is shown with a corresponding label and with a reference letter from L1 to L7. The interfaces between the protocol layers are defined at an abstract level known as Service Access Point (SAP)

The first three media layers L1, L2 and L3 of the stack 10 are: a physical layer 11, a data link layer 12 and a network layer 13. The remaining layers are host layers and are defined as: a transport layer 14, a session layer 15, a presentation layer 16 and an application layer 17. The last three layers 15-17 are dedicated to data. In the right stack 20 these three last layers are represented by a single Application-specific protocol LA block 40.

It should be noted that the physical layer L1 of the stack 10 OSI/RM has been split into two sublayers in the UniPro specification, namely: a physical Adapter Layer L1.5 and a lower physical sublayer L1 supporting a specification shown as M-PHY.

The block 30 indicated as Device Management Entity (DME) is not shown in the OSI/RM protocol stack but serves as a control plane to initialize and control the layers involved in the actual data transport but not in the data communication.

While being useful for security applications these encryption mechanisms have some limits since they only provide protection for data and leave exposed the transfer of information on communication channels to possible attackers. New emerging Non-Volatile Memories (NVMs) featuring small page size and in-place updates, among other features, are in development.

In all applications involving Non-Volatile Memories (NVMs) it would be highly desirable to guarantee confidentiality, integrity and authenticity on commands, addresses and data.

However, the existing solutions offered by the UFS standard and its primitives do not address this need as they lack to drive authentication and access pattern obfuscation.

Therefore, there is a felt need to provide a safer UFS protocol that may be implemented in all devices using non-volatile memory portions.

Moreover, such a safer UFS protocol should be usable in all future architectures including emerging memories.

The present disclosure suggests intervening at the intermediate level between the physical layers of the UFS protocol, substantially between the physical Adapter Layer L1.5 and the lower physical sublayer L1 supporting the specification M-PHY by adopting a full encryption/decryption scheme to data, address and comments travelling on a communication channel, for instance an interconnecting bus. Wireless or optical communication channels can of course be implemented instead of an interconnecting bus.

One embodiment of the present disclosure relates to an apparatus comprising:
a memory device including at least a memory array and a memory controller coupled to said at least memory array;
a host device coupled to the memory device through a communication channel; and
a hardware and/or software encryption-decryption scheme adopted in said communication channel for data, addresses and commands exchanged with said at least a memory array.

Moreover, the bus encryption or decryption for data, addresses and commands for said at least memory array is implemented according to a UFS protocol.

Moreover, the memory controller communicating with said communication channel is structured for encrypting and/or decrypting said data, addresses and commands but also the host device comprises at least a controller communicating with said communication channel bus and structured to for encrypting and/or decrypting said data, addresses and commands.

The memory device comprises a NAND memory device or a non-volatile memory device.

However, in one embodiment of the present disclosure the memory device may be a hybrid memory device including at least a first storage class memory array and at least a second non-volatile memory array.

While the description below refers to embodiments including a storage class memory and a NAND memory, other embodiments are possible, including different memory types such as for instance: NAND flash memory, NOR flash memory, Read Only Memory (ROM), Electrically Erasable Programmable ROM (EEPROM), Erasable Programmable ROM (EPROM), resistance variable memory such as phase change random access memory (PCRAM), self-selecting chalcogenide-based memories, resistive random access memory (RRAM), 3D XPoint memory (3DXP) and magneto resistive random access memory (MRAM), among others.

For example, the first memory array and the second memory array may respectively be a first memory array portion and a second memory array portion of a single die memory array, or other memory types are used.

The present disclosure further relates to a method for managing data, addresses and commands from/to an apparatus comprising:
exchanging data, addresses and commands on a communication channel of the apparatus,
hardware and/or software encrypting-decrypting data, addresses and commands exchanged on the communication channel.

For a better understanding of the present disclosure it should be noted that a data encryption with AES-XTS, when correctly set-up, would be able to guarantee the required three properties for data, that is to say: confidentiality, integrity and authenticity. However, such an encryption would not confer a protection to addresses or to commands.

On the contrary, protecting systems from unintentional overwrites, malicious attacks and cloning is essential. In some applications is used a technique known as Replay Protected Memory Block (RPMB) provides integrity and authenticity for data, commands and addresses. Using this technique RPMB data erase and write protection commands are authenticated and their integrity is verified, although they are never encrypted.

Moreover, memory addresses are never encrypted.

By tampering with commands and addresses, an attacker could undermine the security of the whole system, e.g. by recovering data which has been discarded but not yet erased or by exploiting hidden vendor commands for example.

By observing the memory access pattern an attacker could be able to mount cache-based attacks, which could lead to the extraction of secrets such as encryption keys.

Moreover, memory controllers are also exposed to fuzzing by an external attacker. This could reveal vulnerabilities in the driver's implementation and lead to privileged code execution in the system.

In any case, current encryption schemes are not designed to leverage emerging memories features such as smaller page size and in-place updates. This causes high latencies and heavy write amplification factors.

Some known techniques have been proposed to reduce the number of write cycles such as, for instance, Data Comparison Write (DCW) and Flip-N-Write (FNW).

Both these techniques leverage the sparseness of the changed bits inside a data word to reduce the number of bits written to mass memory portion. However, good encryption algorithms are characterized by the diffusion property, and therefore two plaintexts with a Hamming distance of 1, when encrypted, will have a Hamming distance of n/2 on average where n is the ciphertext size.

Therefore, storing encrypted data in an emerging memory nullifies the eventual write-saving techniques, thus decreasing its expected lifetime.

For example, the minimum granularity of data encryption with AES-XTS in UFS drives is 128 bits, therefore even a single-bit change in one plaintext word results in an average of 64 bits changed in the corresponding ciphertext.

To avoid all the above-mentioned drawbacks some embodiments of the present disclosure provide a new bus encryption method for non-volatile memory devices using a UFS protocol.

The proposed architecture stores data in plaintext form thus leveraging all the existing write-reduction techniques and provides a write amplification factor equivalent to the unencrypted alternative.

The novel architecture of the present technology performs bus-only encryption to guarantee that data, addresses and commands sent to storage peripherals are not disclosed to and modified by an external attacker.

Moreover, according to some embodiments of the present disclosure, the disclosed architecture paves the way for the future integration of emerging memories such as 3D XPoint (3DXP) with the UFS protocol.

The idea underlying the architecture of the present disclosure is that of adopting an encryption-decryption scheme that prevents bus snooping while defining a complete computation architecture.

The original idea to integrate a bus-only encryption scheme on an existing storage protocol allows improving the security of an electronic apparatus including memory portions interconnected to a controller, as will be clearer by the following description.

The present disclosure includes apparatuses and methods related to hybrid memory management; for instance, a memory device including at least a first storage class memory array and at least a second non-volatile memory array.

An example apparatus can include a first memory array, several second memory arrays, and a controller coupled to the first memory array and to the number of second memory arrays.

The memory device can be a hybrid memory device, where the first memory array can be a storage class memory and the number of second memory arrays can be a different type of memory, such as NAND Flash memory.

All the above-mentioned memory devices may be configured to execute a write operation. In several embodiments, a write operation can be executed on a memory device that includes a first memory array and several second memory arrays.

Execution of the write operation involves writing data to the first memory array starting at a location indicated by a write cursor and place the write cursor at an updated location in the first memory array upon completing execution of the write operation, wherein the updated location is a next available location in the first memory array.

The write operation can include writing data to the first memory array and/or the number of second memory array. The data can be written to the first memory array responsive to an amount of data stored in the first memory array being below a threshold amount.

In several embodiments, write operations executed on a first memory array can be written based on a write cursor that indicates a location where a write operation will start.

The location of the write cursor can be based on the status of several managed units in the write array, where each managed unit can have a status of valid, invalid, free, or do not use.

The location of the write cursor can be updated and placed at a next managed unit having a free status after each write operation.

For example, the managed units can be assigned addresses in a sequential order based on their physical location and the managed units are iterated through in a sequential order based on their address to determine the status of the managed units and place the write cursor at an updated location.

Similarly, in several embodiments read operations can include determining managed unit pattern disturb levels and a raw bit error rate (RBER) for data in a first memory array.

When the managed unit pattern disturb level is above a threshold or the raw bit error rate (RBER) is above a threshold, a move operation can be performed to move the data to a new location in the first memory array.

The data can be moved to a new location when the RBER is above a threshold because an error correction (ECC) operation may not be able to correct errors when reading the data from its original location.

The data can be moved to a new location when the managed unit pattern disturb level is above a threshold because errors can be more likely to occur when reading data from a location where neighboring managed units have been programmed at least a number of times.

In the following detailed description of the present disclosure, reference is made to the accompanying drawings that form a part hereof, and in which is shown by way of illustration how one or more embodiments of the disclosure may be practiced.

These embodiments are described in enough detail to enable those of ordinary skill in the art to practice the embodiments of this disclosure, and it is to be understood that other embodiments may be utilized and that process, electrical, and structural changes may be made without departing from the scope of the present disclosure.

As used herein, designators such as "N" or "M", etc., particularly with respect to reference numerals in the drawings, indicate that several particular features so designated can be included. It is also to be understood that the terminology used herein is for describing particular embodiments only, and it is not intended to be limiting.

As used herein, the singular forms "a", "an", and "the" can include both singular and plural referents, unless the context clearly dictates otherwise. In addition, "a number of", "at least one", and "one or more" (e.g., several memory arrays) can refer to one or more memory arrays, whereas a "plurality of" is intended to refer to more than one of such things.

Furthermore, the words "can" and "may" are used throughout this application in a permissive sense (i.e., having the potential to, being able to), not in a mandatory sense (i.e., must). The term "include," and derivations thereof, means "including, but not limited to".

The terms "coupled" and "coupling" mean to be directly or indirectly connected physically or for access to and movement (transmission) of commands and/or data, as appropriate to the context. The terms "data" and "data values" are used interchangeably herein and can have the same meaning, as appropriate to the context.

The figures herein follow a numbering convention in which the first digit or digits correspond to the figure number and the remaining digits identify an element or component in the figure.

Similar elements or components between different figures may be identified using similar digits. As will be appreciated, elements shown in the various embodiments herein can be added, exchanged, and/or eliminated to provide several additional embodiments of the present disclosure.

In addition, the proportion and/or the relative scale of the elements provided in the figures are intended to illustrate certain embodiments of the present disclosure and should not be taken in a limiting sense.

FIG. 1 is a block diagram of an apparatus in the form of a computing system 100 including a memory device 106 in accordance with several embodiments of the present disclosure.

As used herein, an "apparatus" can refer to, but is not limited to, any of a variety of structures or combinations of structures, such as a circuit or circuitry, a die or dice, a module or modules, a device or devices, or a system or systems, for example.

In several embodiments, the computing system 100 can include a number of memory devices. In the embodiment illustrated in FIG. 1, memory device 106 can include a first memory type (e.g., a first memory array 110) and a second memory type (e.g., a number of second memory arrays 112-1, . . . , 112-N).

The memory device 106 can be a hybrid memory device, where memory device 106 includes the first memory array 110 that is a different type of memory than the number of second memory arrays 112-1, . . . , 112-N.

The first memory array 110 can be storage class memory (SCM), which can be a non-volatile memory that acts as main memory for the memory device 106 because it has faster access time than the number of second memory arrays 112-1, . . . , 112-N.

The first memory array 110 can be phase change memory (PCM), spin torque transfer (SST) memory, ferroelectric (FeRAM), a 3D XPoint memory (3DXP), a self-selecting chalcogenide-based memory, and/or resistive (RRAM), among other types of non-volatile memory.

The number of second memory arrays 112-1, . . . , 112-N can act as a data store (e.g., storage memory) for memory device 106 and can be NAND Flash memory, among other types of memory.

For example, the number of second memory arrays 112-1, . . . , 112-N can be RAM, ROM, DRAM, SDRAM, PCRAM, RRAM, and flash memory, among others.

As illustrated in FIG. 1, host 102 can be coupled to the memory device 106 via interface 104. Host 104 and memory device 106 can communicate (e.g., send commands and/or data) on interface or channel 104.

The host device 102 can be a System-on-Chip with an embedded memory component 106 or a more complex electronic device including a system connected to a memory device, as will appear from the description of other embodiments of the present disclosure made with reference to other figures.

Host 102 can be a laptop computer, personal computers, digital camera, digital recording and playback device, mobile telephone, PDA, memory card reader, interface hub, among other host systems, and can include a memory access device, e.g., a processor.

One of ordinary skill in the art will appreciate that "a processor" can intend one or more processors, such as a parallel processing system, several coprocessors, etc.

Memory device 106 includes controller 108 to communicate with host 102 and the first memory array 110 and the number of second memory arrays 112-1, . . . , 112-N.

Controller 108 can send commands to perform operations on the first memory array 110 and the number of second memory arrays 112-1, . . . , 112-N. Controller 108 can communicate with the first memory array 110 and the number of second memory arrays 112-1, . . . , 112-N to read, write, move, and/or erase data, among other operations.

Controller 108 can control several data flow on the memory device 106.

For example, the controller 108 can control writing data to the first memory array 110, writing data to the number of second memory arrays 112-1, . . . , 112-N, reading data from the first memory array 110, reading data from the number of second memory arrays 112-1, . . . , 112-N, moving data from the first memory array 110 to the number of second memory arrays 112-1, . . . , 112-N, and moving data from the number of second memory arrays 112-1, . . . , 112-N to the first memory array 110.

Host 102 includes a host controller to communicate with memory device 106. The host controller can send commands to memory device 106 via interface 104. The host controller can communicate with memory device 106 and/or the controller 108 on the memory device 106 to read, write, and erase data, among other operations.

Controller 108 on memory device 106 and/or the host controller on host 102 can include control circuitry (e.g., hardware, firmware, and/or software).

In one or more embodiments, controller 108 on memory device 106 and/or the host controller on host 102 can include control circuitry can be an application specific integrated circuit (ASIC) coupled to a printed circuit board including a physical interface. Also, memory device 106 and host 102 can include a buffer of volatile and/or non-volatile memory and several registers.

For the purpose of the present disclosure it has been assumed that the whole computing system 100 is a secure domain and this means that even the host 102 and the memory device 106 are secure domains. This hypothesis that the host 102 and the memory device 106 are secure domains is reasonable since several anti-tampering techniques are available for use in silicon chips.

In at least one embodiment of the present disclosure it is proposed a bus-encryption architecture that is integrated into the interface 104 between the host device 102 and the memory device 106 as UFS standard, to protect data, command and addresses.

The UFS protocol of the interface or channel 104 already uses an LFSR (Linear Feedback Shift Register) to scramble data before they are encoded at the layer L1.5 in the UniPro specification, as shown in FIG. 1A and FIG. 1 respectively.

By replacing that LFSR with a secure stream cipher according to the present disclosure it is possible to guarantee important security properties. As previously mentioned, the present disclosure suggests intervening at the intermediate level between the physical layers of the UFS protocol, substantially between the physical Adapter Layer L1.5 and the lower physical sublayer L1 supporting the specification M-PHY normally used to transmit symbols. An encryption/decryption layer is substantially integrated into an existing layer.

More specifically, according to the present embodiment, the symbols that are ready to be sent are handled into the Adapter Layer L1.5 to render such symbols the more similar possible to noise, i.e. random data. This allows avoiding possible disturbs on the transmission channel 104.

In other words, the invention intervenes on the UFS protocol by adopting at the physical level a full encryption/decryption scheme to data, address and commands travelling on a communication channel, for instance an interconnecting bus.

The model that has been adopted for the encryption and/or decryption phase is an authenticated encryption with associated data (AEAD) are forms of encryption which simultaneously assure the confidentiality and authenticity of data. These attributes are provided under a single, easy to use programming interface.

Figure 2:
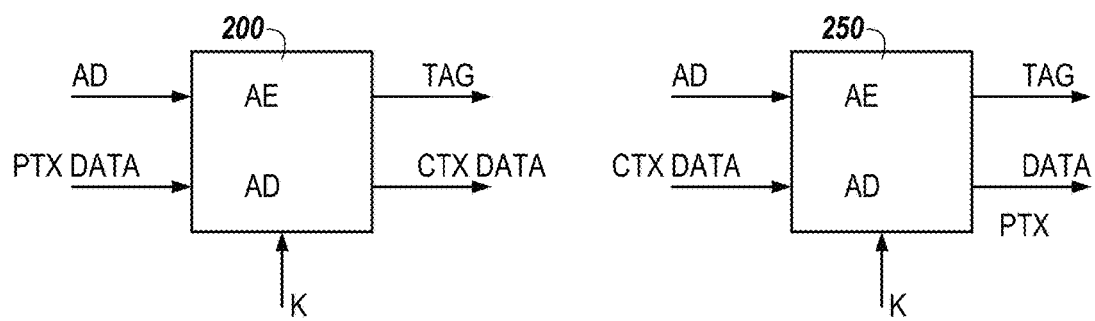
FIG. 2 is a schematic view of a block diagram showing an encryption and decryption scheme according to the the present disclosure.

For example, let's now refer to FIG. 2 wherein a generic primitive AEAD encryption block 200 is shown together with a generic AEAD decryption block 250.

An input K for the block 200 is the secret key. The input DATA can also be considered a plain text PTX with associated data AD. These associated data are not cyphered but have an influence on the result of the cyphered data, for instance like a signature on the data.

So, one output of the block 200 is represented by a data stream of cyphered data CTX DATA and another output is represented by a TAG value to be transmitted on the communication channel.

If we consider the decrypting block 250 we may note that a data input is the first output CTX DATA of the encrypting block 200 and a second input is represented by the associated data AD of the same block 200. Using the same associated data AD would allow obtaining the original plain text PTX.

The situation disclosed above guarantees the data confidentiality. If just one or the other of the two blocks 200 or 250 would modified, for instance in terms of associated data, a different plain text PTX and a different TAG would be obtained. However, since the TAG value is transmitted through the channel to the deciphering block 250 it is possible to check if the TAG value remains the same (otherwise the data have been altered), thus obtaining also data integrity.

If we obtain confidentiality and integrity, then also the third data authenticity property is obtained as well.

For performance reasons it is appropriate to use a stream cipher so that it is possible to generate the pseudo-random byte-stream ahead of time without dependencies on the data being transferred. However, ciphering would guarantee the confidentiality of the data but not integrity while, as we have seen, using a Hash function we would guarantee integrity but not confidentiality. The combination of both measures can guarantee both the two properties and, as consequence, also the authenticity.

The UFS protocol has to be slightly adapted to support the exchange of the Initialization Vectors IVs, protection against downgrade attacks and key initialization. This Initialization vector is a data array which is employed to initialize a cipher and contributes to determine the cipher output.

Figure 3:
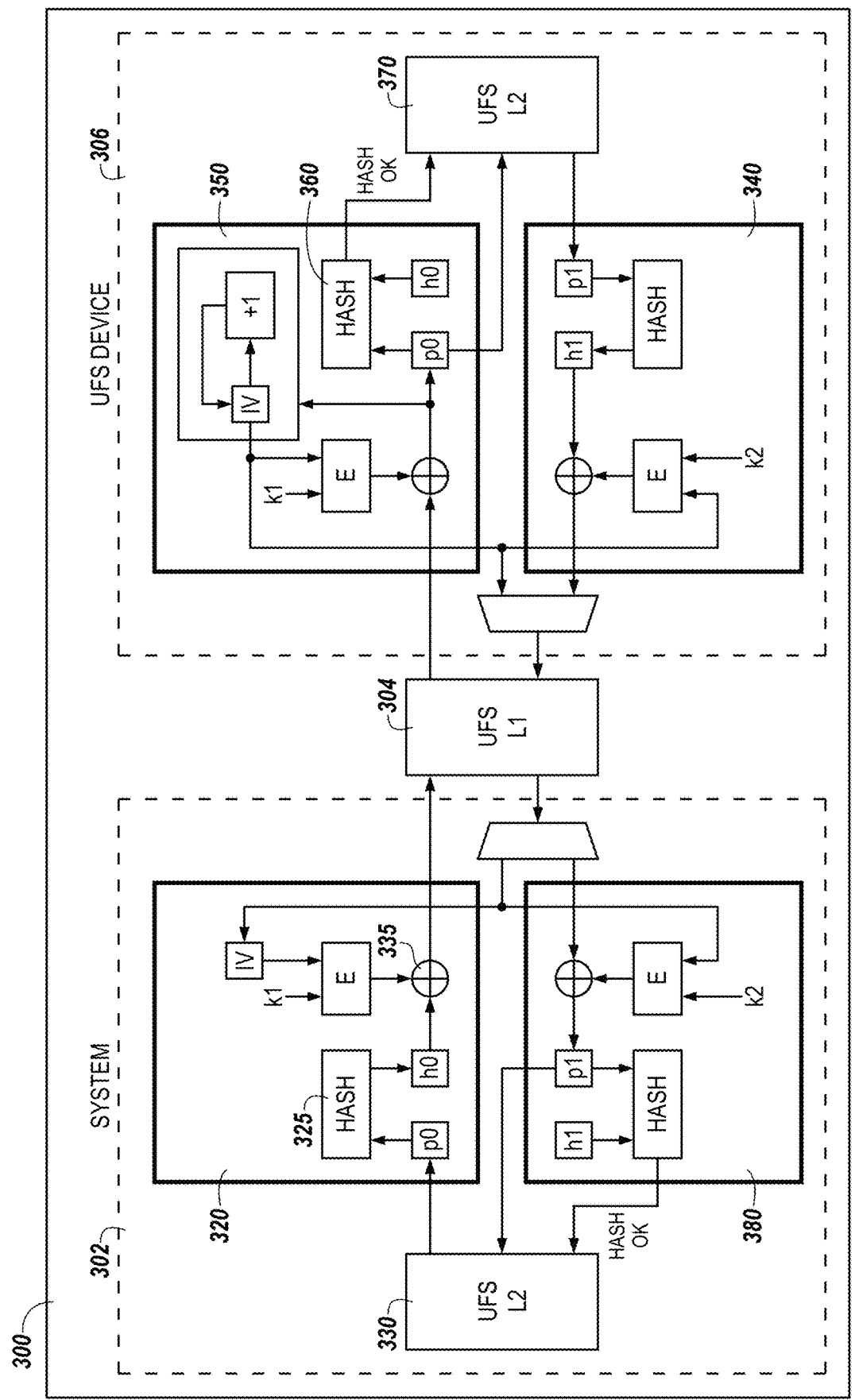
FIG. 3 is a schematic view of a block diagram showing a host device and an associated memory device exchanging data according with several embodiments of the present disclosure.

In this respect, a functional block of the protocol architecture of the present disclosure is shown in FIG. 3.

The UFS protocol already employs a 256 bit shared secret to provide RPMB functionalities. The same shared secret can be employed in the example shown in the architecture of FIG. 3.

The shared secret is usually initialized by the host 102 during production and may be reset after a full mass memory portion secure erase.

To avoid counter-reuse attacks, the same data must be never encrypted with the same Initialization Vector IV and the same key twice.

If an attacker has active access to the bus, he/she can tamper with the IV, which is always sent in cleartext, thus being able to force one endpoint in generating the same pseudo random stream twice.

One possibility to address this potential problem it would be to authenticate the Initialization Vector IV messages, so that the other endpoint can be sure that the IV has not been tampered with.

An HMAC message authentication protocol, standardized by NIST in 2008 can be adopted for this purpose. Reference can be made to: N. I. of Standards and Technology, "The keyed-hash message authentication code (HMAC)" 2008.

FIG. 3 shows a schematic view reporting the application of the encryption and decryption scheme of FIG. 2 in the computing system architecture 100 of the present disclosure.

For instance, the computing system 300 corresponds to the computing system 100 of FIG. 1 including a host system 302 and a memory device 306 operating according to a UFS protocol in a communication channel established between them. Both the host system 302 and in the memory device 306 comprise a UFS L2 block representing the upper adaptive physical layer of the UFS protocol.

A UFS L1 block 304 may be considered the communication channel as a physical sublayer.

Both the host system 302 and in the memory device 306 own the same key K1 (i.e. a password) that has been rendered common in a previous step. In other words, we have no keys exchange in this example.

In this implementation the encryption block 200 of FIG. 2 is equivalent to the block 320 wherein the associate data AD is represented by the initialization vector IV and the cryptographic primitive functions are a stream cipher and a HASH function. In other words, here we have a combination of a hash function and a symmetric stream cipher, used as cryptographic primitives in block 320.

In this example the dotted block labelled "system" 302 may be considered a generic host device as the block 102 of FIG. 1 while the dotted block labelled "UFS Device" 306 may be considered the memory device 106 of FIG. 1.

Both these blocks 302 and 306 include hardware to transmit and receive information on a communication channel 304 that can be a physical channel such as a wired bus, a wireless channel or an optical channel.

Focusing our attention on the system block 302 it may be appreciated that it includes a Hash function block 325 active on a p0 value produced by the block 330 representing a UFS layer L2. The cryptographic hash function of the block 325 includes a mathematical algorithm that maps data of arbitrary size to a bit string of a fixed size (a hash) and is designed to be a one-way function.

The block 325 generates a value h0, that is combined with the p0 value. The result of the combination is added in a logic summing node 335 to the output of a stream cipher block E active as a Pseudo-Random-Number-Generator using a secret key K1 as seed. The initialization vector IV is also provided as input of the stream cipher block E.

The output of the summing node 335 is addressed to the communication channel 304 and received by a symmetric structure including a decrypting block 350 located in the UFS Device block 306, i.e. the memory device.

So, the combination of the Hash block 325 and stream cipher E is doubled in a symmetrical encryption block 350 structured in a similar manner with a Hash function 360 active on the values p0 and h0 verifying that the hash value is correct. The decrypted result is provided to the block 370 representing a UFS layer L2 in the memory device 306.

The above disclosed basic structure of the encrypting and decrypting blocks 320 and 350 has been doubled in corresponding encrypting and decrypting block 340 and 380 incorporated in the memory device 306 and in the host device 302 respectively.

These blocks 340, 380 include also the combined hash function and a symmetric stream cipher of the corresponding blocks 320 and 350 and are active on the values p1 and h1 using a secret key K2 as seed for the stream cipher E.

Since the internal structure of these blocks 340, 380 correspond to that of the symmetrical blocks 320 and 350 we will omit their detailed description.

The memory device 306 comprises a decrypting block 350 that may be considered equivalent to the decrypting block 250 of FIG. 2. Even in this case, a symmetric stream cipher and HASH function primitives are used.

It should be clear from the previous disclosure that the selection of primitive functions is not fundamental for a correct implementation of the present technology.

Figure 4:
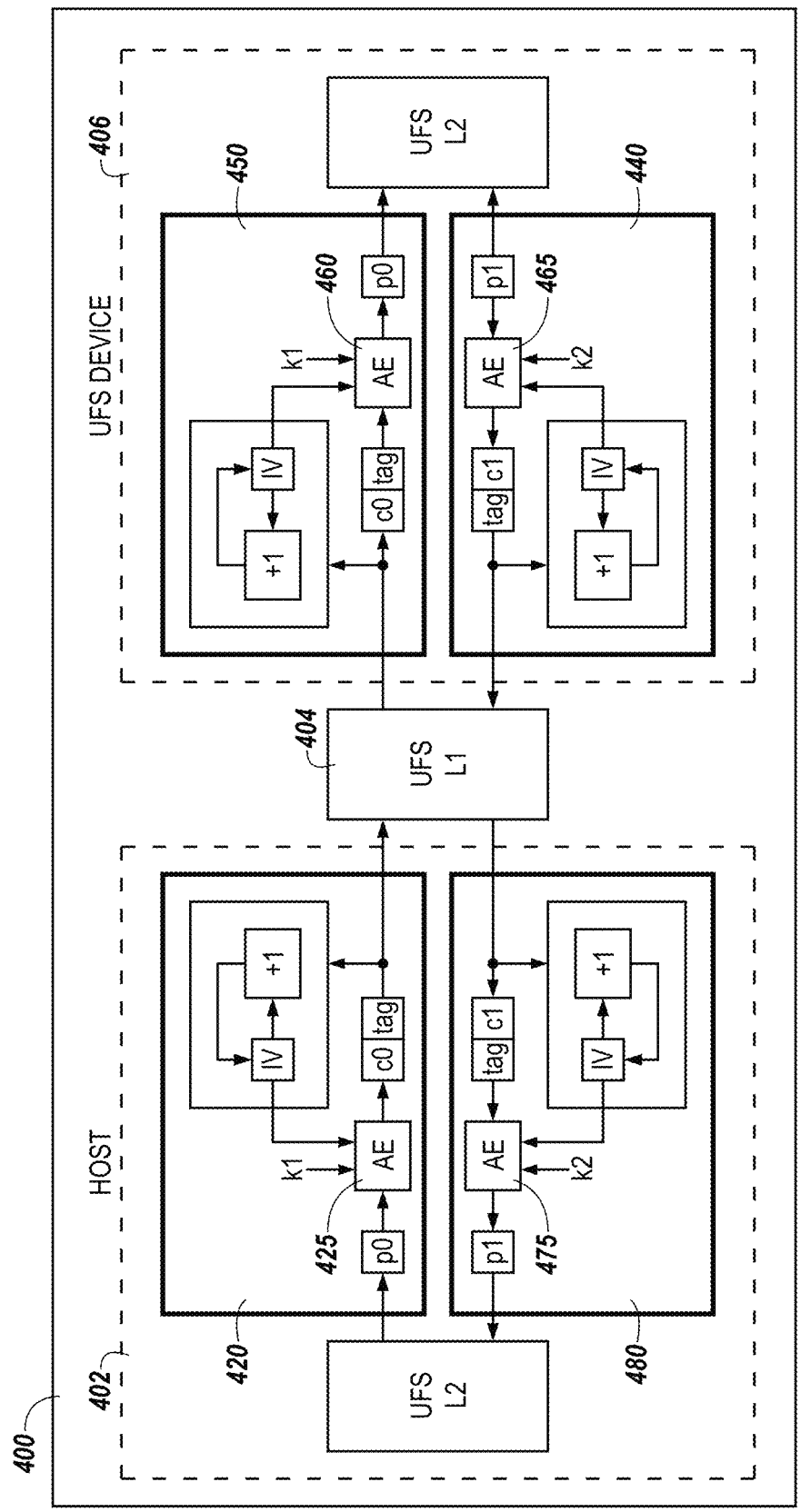
FIG. 4 is another schematic view of a block diagram showing a host device and an associated memory device exchanging data according with several embodiments of the present disclosure.

For instance, an alternative implementation block scheme is reported in FIG. 4 making use of an authenticated encryption AE with associated data (AEAD).

FIG. 4 shows a schematic view reporting the application of the encryption and decryption scheme of FIG. 2 in the computing system architecture 100 of the present disclosure.

For instance, the computing system 400 corresponds to the computing system 100 of FIG. 1 including a host system 402 and a memory device 406 operating according to a UFS protocol. Both the host system 402 and the memory device 406 comprise a UFS L2 block representing the upper adaptive physical layer.

A UFS L1 block 404 may be considered the communication channel as a physical sublayer.

Both the host system 402 and in the memory device 406 own the same key K1 (i.e. a password) that has been rendered common in a previous step. In other words, we have no keys exchange in this example.

In this example the host device 402 includes an encrypting block 420 including an authenticated encryption AE 425 receiving as inputs a secret keys K1 and the initialization vector IV.

The authenticated encryption block 425 is active on a value p0 and produces as output the values c0 and tag. This output is addressed to the communication channel 404.

Similarly, the memory device 406 includes a corresponding and symmetrical decrypting block 450 including as well an authenticated decryption block 460 receiving as inputs a secret keys K1 and the initialization vector IV.

The memory device includes also an authenticated encryption AE block 465 receiving as inputs a secret keys K2 and the initialization vector IV. The authenticated encryption block 465 is active on a value p1 and produces as output the values c1 and tag. This output is addressed to the communication channel 404.

Similarly, the host device 402 includes a corresponding and symmetrical decrypting block 480 including as well an authenticated decryption block 475 receiving as inputs a secret keys K2 and the initialization vector IV.

For completeness of disclosure it should be noted that a physical layer UFS comprises in many occasions not a single couple of interconnections, like those shown in the FIGS. 3 and 4 but a plurality of interconnections named Lanes.

Therefore, for any lane the cryptography is replicated, as shown in the symmetric block using the second key K2 in both FIGS. 3 and 4.

To hinder the birthday paradox attack and avoid Initialization Vector IV repetitions, the party who transmits the IVs should generate them using a large counter.

As it happens with the current UFS data scrambling algorithm, synchronization between hosts can be lost, if that happens, a deskew pattern is sent in cleartext. When the pattern is received, the encryption must be reset and a new IV must be generated and transmitted to the host.

Figure 5:
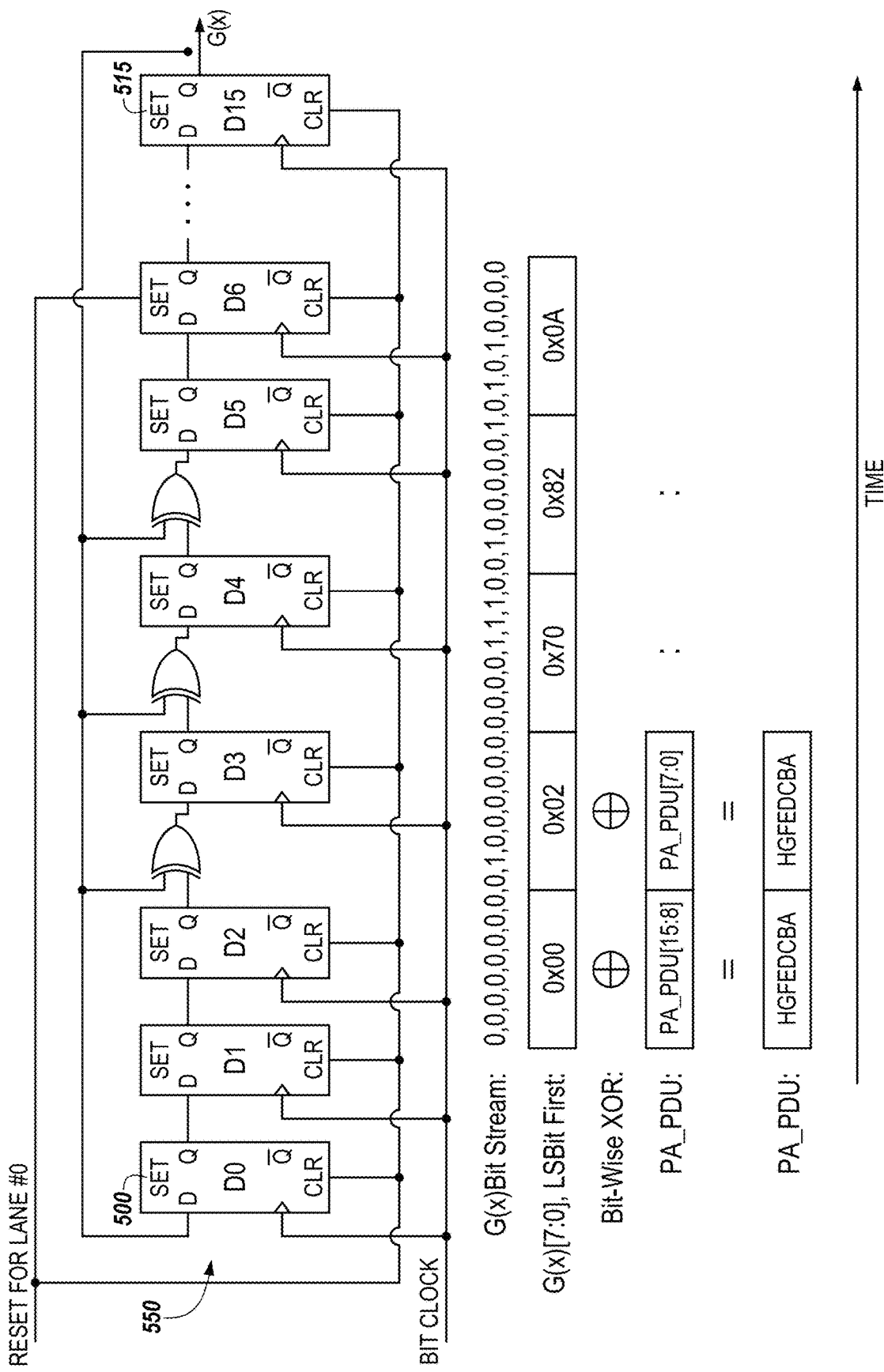
FIG. 5 shows a schematic view of Data Scrambling technique used inside a UniPro layers protocol of the device of the present disclosure.

Just for completeness of disclosure we will now refer to an example shown in FIG. 5 for describing a Data Scrambling technique used inside the M-PHY block to mitigate problems related to electromagnetic interference.

More specifically, the example of scrambling is reported with reference to a single Lane #0 indicated with the number 550 among a group of at least four lanes. The scrambling feature is optional but the UniPro implementation includes support for scrambling.

Data being transmitted shall be scrambled with a Pseudo-Random-Bit-Stream (PRBS) to reduce the likelihood of repetitive pattern in the link. Scrambling support shall be implemented in inbound and outbound direction of the PA Layer. A UniPro PA Layer (or PHY Adapter Layer) is an intermediate layer between the levels L1 and L2 and implements skip symbol insertion at the PA-TX, as we will see hereinafter. Scrambling shall be enabled or disabled at every Power Mode Change request. The new scrambling settings apply to the link at the first burst following the completed Power Mode change procedure.

Once the scrambling is activated it shall not be deactivated but just reset.

After one or the other of the commands UniPro Cold or Warm Reset, the scrambling process is disabled. Scrambling shall be requested only, if the peer device has flagged the ability to descramble data during a PACP_CAP_EXT1_ind exchange (PA_PeerScrambling). A scrambling request always involves scrambling on inbound and outbound link. However, scrambling shall be applied only to Links in Fast_Mode or FastAuto_Mode. Links in Slow_Mode or SlowAuto_Mode are not scrambled, despite an active request for scrambling.

The PA-Layer shall scramble at the transmitter after PA_PDU mapping to 8-bit M-PHY symbols and before 8b10b encoding inside M-TX. The PA-Layer shall descramble at the receiver after 10b8b decoding inside the M-RX and before matching 8-bit M-RX symbols to PA_PDUs.

M-PHY skip symbols, if used, are always inserted at the PA TX between scrambler and 8b10b encoder and removed at the PA RX between 10b8b decoder and de-scrambler.

Data Scrambling shall apply on a per-Lane base. In Multi-Lane M-PORT Links, scrambling shall appear as independent between the Lanes. All active Lanes, and Lanes transmitting a dummy burst, going into the same direction shall be scrambled. M-PHY Marker symbols shall never be scrambled. M-PHY Data symbols shall be scrambled, if the scrambling process is enabled.

The PRBS shall be generated using the Galois form of a Linear Feedback Shift Register (LFSR) including the cells from 500 to 515 and implementing the generator polynomial:

$$G(x) = x16 + x5 + x4 + x3 + 1$$

The LFSR shall be initialized dependent on the logical Lane number to the following 16-bit seed values:
Logical Lane 0: seed=0x0040
Logical Lane 1: seed=0x0080
Logical Lane 2: seed=0x00C0
Logical Lane 3: seed=0x0100

In active lanes, initialization shall be triggered during transmission or reception of a deskew sequence <MK0, MK1> and the following M-PHY Data Symbol shall be scrambled starting with the (re-) initialized LFSR output G(x). Lanes transmitting a dummy Burst shall initialize the LFSR at the start of the Burst. A Tester Equipment attempting in-flight Line snooping may use the deskew-pattern to synchronize its own descrambler.

The LFSR shall generate an eight-bit sequence at G(x) for every M-PHY Symbol to be scrambled, starting from its reset value. The LFSR shall generate new bit sequences of G(x) for every M-PHY symbol, the LFSR polynomial generation shall also advance for eight-bit cycles, when M-PHY marker symbols are presented to the scrambler. However, skip symbol insertion shall not advance the LFSR as skip symbol insertion logically happens after the scrambling process.

Scrambling shall be achieved by bit-wise addition (X-OR) of a sequence of eight bits G(x) with the M-PHY data Symbol bit to be scrambled, starting from bit 0 up to bit 7 of the 8-bit M-PHY data symbol. The scrambler scrambles the high symbol of the <high, low> symbol pair first.

The bus-encryption architecture proposed in the present disclosure has a general validity and may be implemented in many ways.

FIGS. 3 and 4 are reported as possible examples of implementation. Those examples relate to implementation hypotheses which are tailored on mobile high-performance storage infrastructures.

Both the enclosed implementation hypotheses are based on well-known cryptographic building blocks, which have undergone extensive and independent cryptanalytic efforts.

The first optional implementation shown in FIG. 3 is an architecture with a fast stream cipher and an appended hash digest to the plaintext message to guarantee integrity.

We need a hash algorithm which takes an arbitrary input length, outputs a HASH function which is at least 128 bit with a low latency.

The chosen HASH function must be cryptographically secure to avoid first and second preimage collisions.

Among the possible alternative functions, it has been selected the ones shown in Table 1 which are SHA-256 which is already embedded in UFS controllers and SHA-3 which has been standardized by NIST in 2015.

TABLE 1

(Hash Algorithms Benchmark)

| Hash | Block Size (b) | Latency (cycles) | Area (GE) | Tech (μm) | Throughput (MB/s) |
|---|---|---|---|---|---|
| SHA-256 | 512 | 68 | 21670 | 0.130 | 189 |
| SHA-3 | 1024 | 24 | 42490 | 0.130 | 1334 |

SHA-3 bears a high area consumption but would be able to cover a single lane at full speed with one hashing core.
Part of the ISO/IEC standard
Optimized for lightweight hardware encryption
10× more energy efficient than AES-GCM when implemented in FPGA As an alternative, as shown in FIG. 4, it is proposed an architecture using an Authenticated Encryption (AE) primitive, so to generate the integrity tag during encryption and to perform the decryption and authentication steps at the same time.

In the following Table 2 we can see the two reference implementations of Enocoro-128v2.

TABLE 2

(Cryptographic Algorithms Benchmark)

| Cipher | Key Size (b) | Biock Size (b) | IV Size (b) | Latency (cycles) | Area (GE) | Tech (μm) | Throughput (MB/s) |
|---|---|---|---|---|---|---|---|
| Enocoro (area) | 128 | 1 | 64 | 1 | 4100 | 0.090 | 400 |
| Enocoro (speed) | 128 | 1 | 64 | 1 | 8700 | 0.090 | 1250 |
| Acorn (area) | 128 | 8 | 128 | 1 | 6580 | 0.065 | 1136 |
| Acorn (speed) | 128 | 32 | 128 | 1 | 11760 | 0.065 | 4255 |
| Keccak (speed) | 128 | 1600 | — | 24 | 55900 | 0.090 | 5500 |
| AES | 128 | 128 | — | 226 | 2400 | 0.350 | 57* |

A block scheme of this implementation is shown in FIG. 4.

An AE primitive is like a stream cipher in its operation, except that it is able to produce an arbitrary length authentication tag.

If during decryption the received tag does not match with the computed one, no results are returned, to impede Chosen-Ciphertext Attacks (CCA).

Using the function ACORN as an authenticated stream cipher has allowed to obtain an efficient result in all hardware implementations.

Cryptanalytic works have reported that an ACORN function may present an Adaptive-Chosen-Plaintext Attack (CPA2) risk and is vulnerable to the Fault Injection Side Channel Attack.

However, none of the two attacks makes the cipher insecure in everyday use.

The authentication tag can be sized, by choosing a size of 128 bits it is possible to have a probability of brute-forcing the tag which is as high as the one of brute-forcing the encryption key.

When using the ACORN cipher, different IV/Key pairs must be used for every encrypted message. Instead of exchanging a new 128 bit IV at every message we can employ a 128 bit counter, incremented every time a new message is sent.

Counters can be synchronized after a deskew pattern is sent.

For the lane synchronization a possible method could be the following: a PA Layer RX shall lock the PA Layer symbol synchronization on each Lane every time the deskew pattern is received. M-RX handles the M-PHY symbol synchronization by locking to MK0, which is the high part of the deskew pattern.

In the multi-Lane usage, the PA Layer shall synchronize the multiple incoming Lanes because of the skew between the Lanes and because of the independent RX clocks of the M-RXs. The Lane synchronization happens by aligning the incoming deskew patterns that are sent in parallel from the transmitter. Depending of the deskew requirements, this may require, for example, creating shallow deskew-FIFOs within the PA Layer RX.

The principle operation of the aligner shall be as follows:
1. When the burst starts, Lanes are not synchronized
2. Per each active Lane not having detected the deskew pattern, PA Layer RX discards PA symbols until it detects the deskew pattern
3. Once all active Lanes have received the deskew pattern, Lane synchronization is successful and PA Layer RX begins to consume PA symbols
4. If PA Layer RX detects a new deskew pattern, the Lane synchronization for all Lanes is lost and the operation returns to Step 2.

In case a deskew pattern is lost and the PA Layer RX cannot acquire the Lane synchronization, the deskew-FIFOs of the synchronized Lanes overflow, which is the intended behaviour. The PA Layer RX shall wait until the peer Device transmits another deskew pattern and shall lock on to this second pattern.

At a minimum, the PA Layer shall be able to operate correctly with a Lane-to-Lane skew of four PA Symbols at its PHY_SAP, see Table 22 for details.

Let's now consider the key management in this content.

The latest UFS 3.0 standard, at its maximum speed (GEAR4) achieves a throughput of 1248 MB/s per lane.

UFS implementation are typically full-duplex with two independent lanes per direction. As a result, up to four encryption cores may be required for each endpoint.

Every core needs an encryption key and care must be taken not to use the same key on all the ciphers, otherwise they will produce the same pseudo-random stream, resulting in an IV-reuse attack setting.

This will lead eventually to the retrieval of part of the protocol messages.

The concatenation of all the encryption keys consumes 512 bits. Since this information is exchanged only once, a convenient solution could be to derive all the key bits from a sound Pseudo Random Number Generator on the host side.

Secondly, the generated keys would have to be stored in an SRAM so that they could be rewritten when the drive is re-initialized.

Finally, it should be noted for completeness sake that the management of the capabilities of the computing system may be handled as follows.

Local and peer M-TX and M-RX may differ in capabilities. To simplify capability checking, the PA Layer forms a common capability value for the whole inbound Link beginning from the peer M-TX and ending with the local M-RX. Equations for calculating the common capability values are listed later in this section. This capability downgrading is automatically performed at the end of the Link Startup Sequence.

Since the automatic downgrading process cannot consider a Basic OMC or the restrictions from the physical interconnection, the Application has the ability to overwrite the calculated capabilities through these Attributes.

While the capability downgrading is done only once, at the end of the Link Startup Sequence, the capability checking is performed whenever there is a request to change the Power Mode. The PA Layer shall verify the inbound Link capabilities. For example, if the local Device wants to change parameters of the outbound Link, the peer PA Layer is responsible for verifying the Link capabilities.

Figure 6:
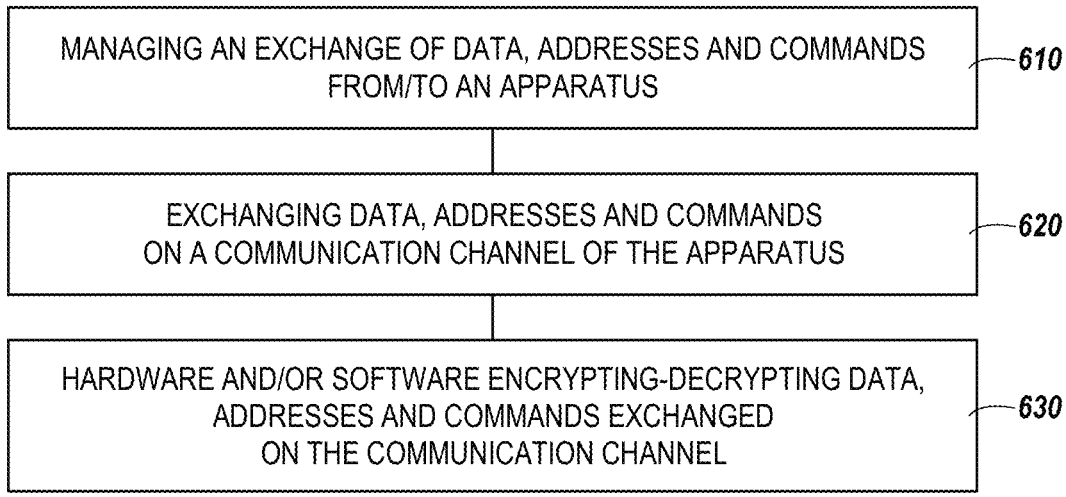
FIG. 6 shows a schematic block diagram reporting the phases of a method according to the present disclosure.
Figure 7:
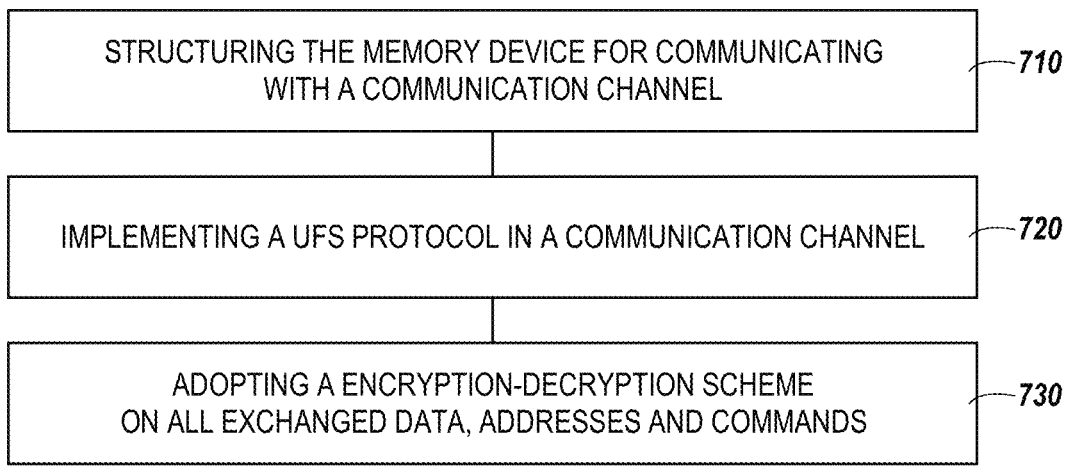
FIG. 7 shows another schematic block diagram reporting some other phases of a method according to the present disclosure.

To summarize the technique disclosed in the embodiments previously reported we may refer to the block diagram of the FIGS. 6 and 7.

It is disclosed a method for managing the exchange of data, addresses and commands in an apparatus comprising:
  a memory device including at least a non-volatile memory array and a controller coupled to said memory array, and
  a host device coupled to the memory device through a communication channel;
  wherein said exchange of data, addresses and commands includes a hardware and/or software encryption-decryption scheme adopted in said communication channel.

The block 610 in FIG. 6 illustrates a method phase wherein a memory device is structured for exchanging data, address and commands with a communication channel, for instance for communicating with a host device such as the host device 102. The memory device can be the schematic block 106 of the computing system of FIG. 1.

The block 610 indicates that the method of the present disclosure is applied for managing the exchange of data, addresses and commands from/to an apparatus, i.e. a memory apparatus.

Then, in phase 620 a hardware and/or software full encryption-decryption scheme on data, addresses and commands is applied.

In this manner three fundamental properties of data, that is to say: confidentiality, integrity and authenticity are obtained for the exchanged data as remarked by the block 630.

This block 630 illustrates that hardware and/or software encrypting-decrypting data, addresses and commands are effectively exchanged on the communication channel.

In an alternative way to define the method of the present disclosure, as reported in FIG. 7, in phase 710 a memory device is structured for communicating with a communication channel, for instance the channel 104 established between the host device 102 and the memory device 106 of FIG. 1.

Then, a UFS protocol is implemented in a communication channel between a host device and a memory device in phase 720.

Then, in phase 730 an encryption-decryption scheme is adopted on all data, addresses and commands exchanged on said communication channel.

Although specific embodiments have been illustrated and described herein, those of ordinary skill in the art will appreciate that an arrangement calculated to achieve the same results can be substituted for the specific embodiments shown. This disclosure is intended to cover adaptations or variations of various embodiments of the present disclosure.

It is to be understood that the above description has been made in an illustrative fashion, and not a restrictive one.

Combination of the above embodiments, and other embodiments not specifically described herein will be apparent to those of skill in the art upon reviewing the above description. The scope of the various embodiments of the present disclosure includes other applications in which the above structures and methods are used. Therefore, the scope of various embodiments of the present disclosure should be determined with reference to the appended claims, along with the full range of equivalents to which such claims are entitled.

The invention claimed is:

1. An apparatus comprising:
a memory device including a memory array;
a host device coupled to the memory device via a communication channel;
the memory device configured to store data in plaintext form;
wherein the memory device and the host device are configured to:
implement a communication channel-only encryption-decryption scheme integrated in the communication channel for the data, addresses, and commands exchanged through the communication channel between the host device and the memory array;
wherein the encryption-decryption scheme includes encryption of the data, addresses, and commands ready to be sent through the communication channel and decryption of the encrypted data back to plaintext form, addresses, and commands received over the communication channel while not increasing write amplification; and
wherein the encryption includes a first hash function, a second hash function arranged symmetrically in an encryption block to the first hash function, a first stream cipher, and a second stream cipher arranged symmetrically in the encryption block to the first stream cipher;
track a TAG value transmitted on the communication channel; and
compare a value of the TAG value before transmission on the communication channel and after transmission on the communication channel.

2. The apparatus of claim 1, wherein the encryption-decryption scheme is implemented according to a UFS protocol.

3. The apparatus of claim 2, wherein the encryption-decryption scheme is implemented as an intervention integrated between a physical Adapter Layer and a lower physical sublayer supporting a specification M-PHY.

4. The apparatus of claim 1, wherein the memory device comprises a non-volatile NAND memory device.

5. The apparatus of claim 1, wherein the memory device includes a memory controller in communication with the communication channel and configured to encrypt the data, addresses, and commands ready to be sent through the communication channel and decrypt the encrypted data, addresses, and commands received over the communication channel.

6. The apparatus of claim 1, wherein the host device includes a controller in communication with the communication channel and configured to encrypt the data, addresses, and commands ready to be sent through the communication channel and decrypt the encrypted data, addresses, and commands received over the communication channel.

7. The apparatus of claim 1, wherein the encryption-decryption scheme includes an authenticated encryption AE block receiving as inputs a secret key and an initialization vector.

8. The apparatus of claim 1, wherein the data, addresses and commands exchanged through the communication channel are encrypted through a Replay Protected Memory Block (RPMB) that guarantees the integrity of data, addresses and commands using a symmetrical encryption.

9. The apparatus of claim 1, wherein the communication channel is an interconnecting bus, a wireless channel, or an optical channel.

10. A memory device including:
a memory controller communicatively coupled to an external device through a communication channel;
wherein the memory controller is configured to:
enable or disable data scrambling each power mode change request,
wherein the data scrambling is performed on inbound data and outbound data;
encrypt addresses, commands, and the data ready to be sent through the communication channel and decrypt encrypted addresses, commands, and the data received over the communication channel,
wherein the encryption includes a first hash function, a second hash function arranged symmetrically in an encryption block to the first hash function, a first stream cipher, and a second stream cipher arranged symmetrically in the encryption block to the first stream cipher;
track a TAG value transmitted on the communication channel; and
compare a value of the TAG value before transmission on the communication channel and after transmission on the communication channel.

11. A memory device according to claim 10, wherein the memory device comprises a storage class memory.

12. The memory device of claim 10, wherein the memory device is a hybrid memory device including a first storage class memory array and a second non-volatile memory array.

13. The memory device of claim 12, wherein the second non-volatile memory array comprises a non-volatile NAND Flash memory device.

14. A method, comprising:
utilizing a universal flash storage (UFS) communication protocol for exchanging data, addresses, and commands across a communication channel communicatively coupled to a memory device; and
implementing a full encryption and decryption scheme for the data, addresses and commands exchanged on the communication channel, wherein implementing the full encryption and decryption scheme includes:
encrypting data, addresses, and commands ready to be sent through the communication channel,
wherein the encryption includes a first hash function, a second hash function arranged symmetrically in an encryption block to the first hash function, a first stream cipher, and a second stream cipher arranged symmetrically in the encryption block to the first stream cipher;
decrypting of encrypted data, addresses, and commands received over the communication channel; and
performing the encrypting and the decrypting as an intervention integrated between a physical Adapter Layer and a lower physical sublayer supporting a specification M-PHY as a portion of a communication channel-only encryption and decryption scheme.

15. The method of claim 14, wherein the encrypting and the decrypting includes a scrambling phase that once activated is not deactivated but reset.

16. The method of claim 14, wherein the encrypting and the decrypting comprises encrypting the data, addresses and commands ready to be sent through the communication channel utilizing an Authenticated Encryption primitive.

\* \* \* \* \*